United States Patent
Tippery et al.

(10) Patent No.: US 7,950,210 B2
(45) Date of Patent: May 31, 2011

(54) FLYWHEEL FOR TIMED KNIFE DRIVE

(75) Inventors: Steve Tippery, Omaha, NE (US); Craig Kaster, Omaha, NE (US)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 186 days.

(21) Appl. No.: 12/254,565

(22) Filed: Oct. 20, 2008

(65) Prior Publication Data

US 2010/0095645 A1 Apr. 22, 2010

(51) Int. Cl.
*A01D 34/00* (2006.01)
(52) U.S. Cl. .............................. 56/12.6; 56/17.6; 56/306
(58) Field of Classification Search .................. 56/12.6, 56/13.5–14.6, 296, 17.6, 306
See application file for complete search history.

(56) References Cited

U.S. PATENT DOCUMENTS

| | | | | |
|---|---|---|---|---|
| 1,351,939 | A | * | 9/1920 | Andre .............................. 56/11.4 |
| 1,757,214 | A | * | 5/1930 | Pearson ........................... 56/10.4 |
| 2,496,469 | A | * | 2/1950 | Hilblom .......................... 56/15.3 |
| 2,850,864 | A | * | 9/1958 | Rohweder ......................... 56/296 |
| 3,561,203 | A | * | 2/1971 | Hurlburt .......................... 56/296 |
| 3,643,408 | A | * | 2/1972 | Kulak et al. ..................... 56/17.4 |
| 7,121,074 | B1 | | 10/2006 | Regier et al. |
| 7,587,885 | B2 | * | 9/2009 | Tippery et al. ................. 56/14.5 |
| 2007/0087891 | A1 | | 4/2007 | Schumacher et al. |
| 2007/0204586 | A1 | | 9/2007 | Coers |

* cited by examiner

*Primary Examiner* — Alicia M. Torres
(74) *Attorney, Agent, or Firm* — Robert C. Haldiman; Husch Blackwell LLP

(57) ABSTRACT

A cutter bar drive system for a draper header has a cutter bar disposed at a leading edge of the header to cut crop. A cutter bar gear box in operative engagement with the cutter bar is mounted on a forward portion of the header with a drive train mounted on the header to drive the gear box and cutter bar. An external flywheel is mounted along the drive train remote from the gear box and is engaged with the drive train to reduce vibration in the cutter bar and gear box from a remote, external position.

9 Claims, 4 Drawing Sheets

FLYWHEEL FOR TIMED KNIFE DRIVE

CROSS-REFERENCE TO RELATED APPLICATIONS

None.

STATEMENT REGARDING FEDERALLY SPONSORED RESEARCH

Not Applicable.

APPENDIX

Not Applicable.

BACKGROUND OF THE INVENTION

1. Field of the Invention

The present invention is in the field of agricultural combines and harvesters, particularly in drive systems for cutter bars.

2. Related Art

Combines and harvesters cut crop with a knife or cutter bar located on the leading edge of the combine header. Cutter bars oscillate at a rate of hundreds of strokes per minute. The cutter bars and gear boxes driving them therefore produce vibration. Vibration decreases product durability and increases operator fatigue.

It is known to use dual timed knife drives wherein each of the left and right hand side of the header has a separate cutter bar. The left and right hand cutter bars are geared in order that their oscillations mirror one another, and thereby mechanically offset the vibrations caused by one another. Although vibrations are reduced in this fashion, they are not eliminated, and the gear boxes themselves also generate vibrations. Gear box gear teeth reciprocate, and drive line torque can reciprocate in both the positive and negative directions, both of which are detrimental to product durability.

SUMMARY OF THE INVENTION

The present invention is a drive system for a cutter bar gear box incorporating a flywheel. The flywheel is external to the gear box and remote from it. In one embodiment of the present invention, the flywheel is located at the rear of a draper header.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
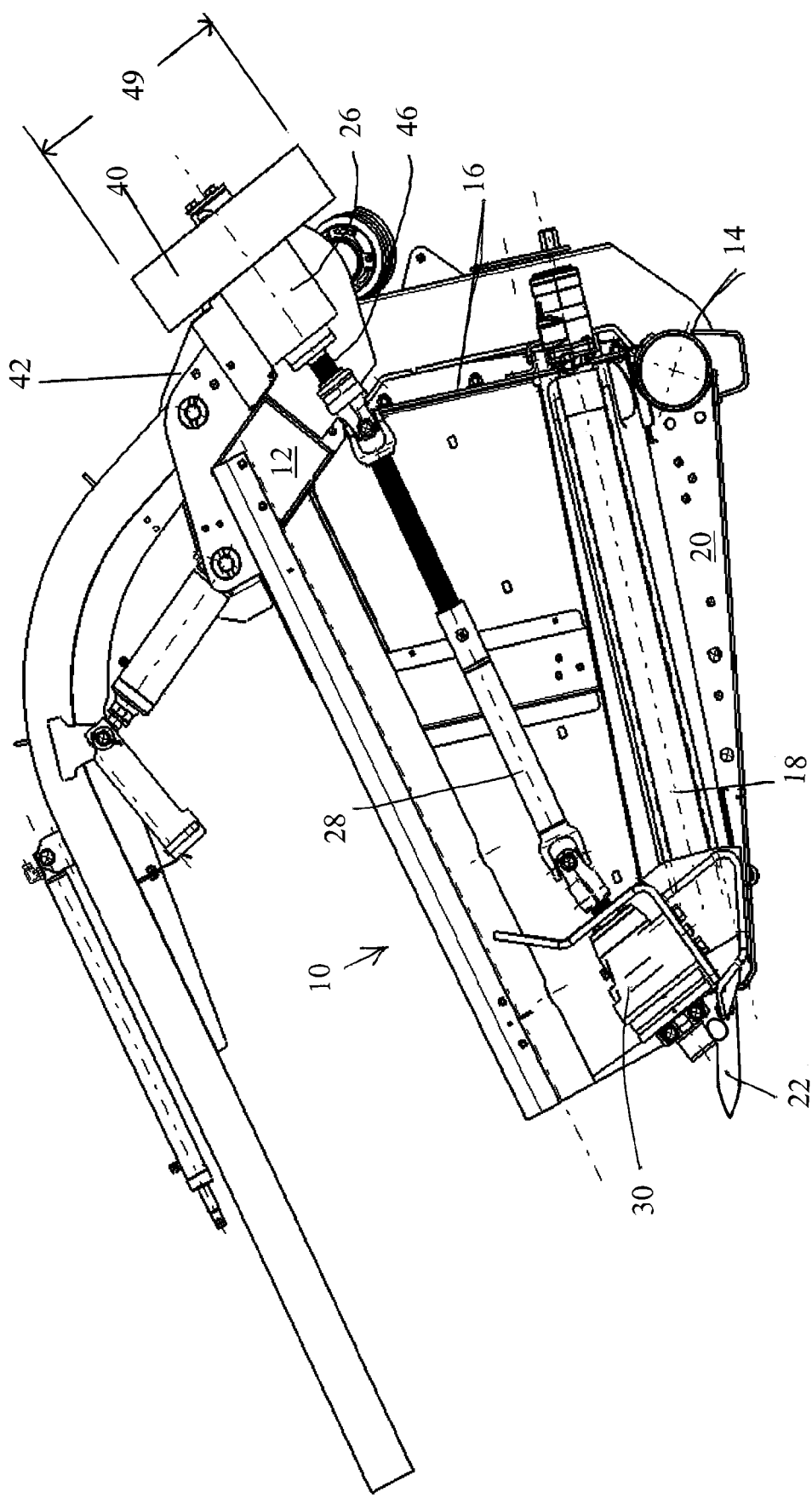
FIG. 1 is a side view of the flywheel and drive system of the present invention.
Figure 2:
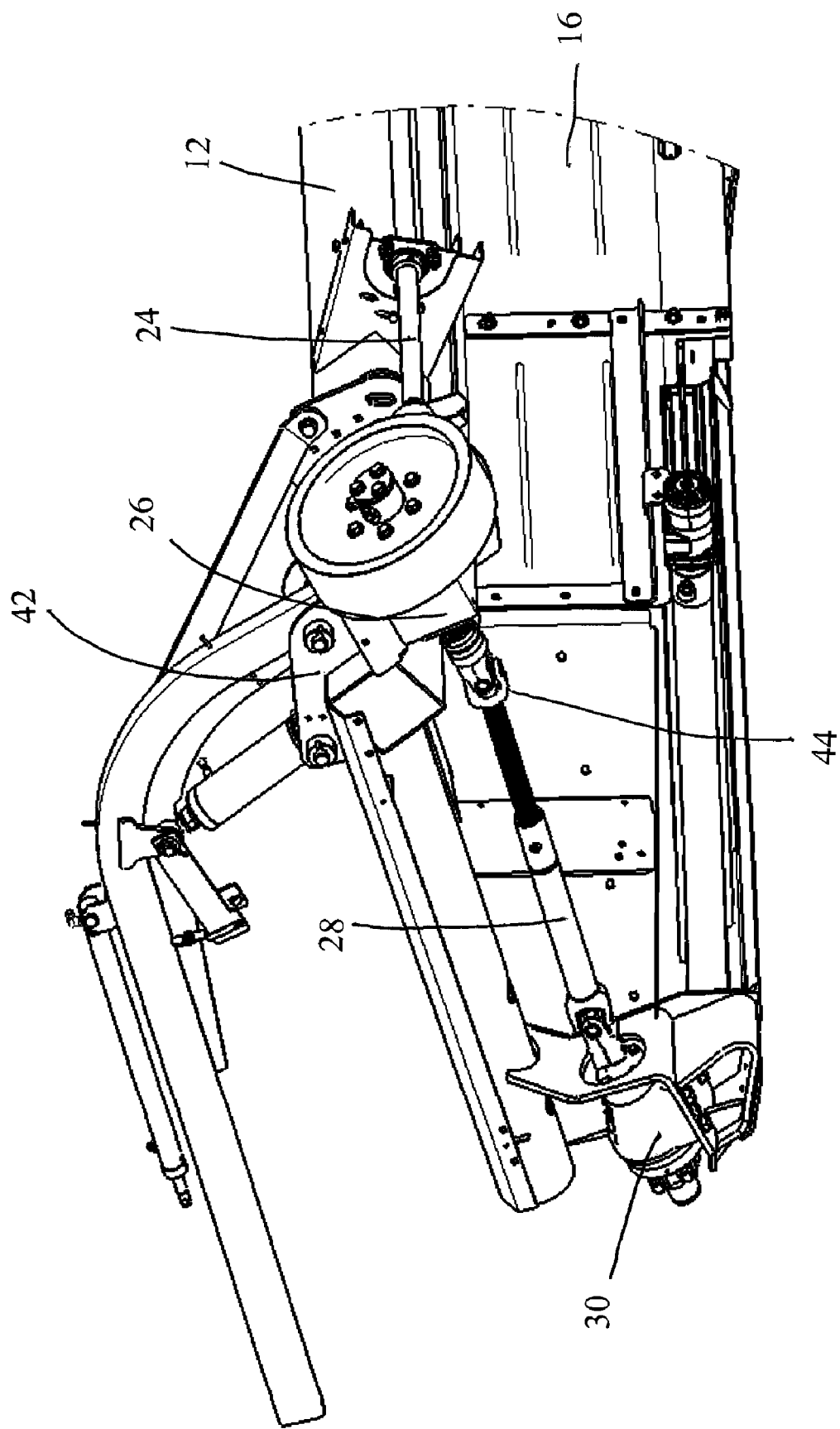
FIG. 2 is a rear perspective view of the flywheel and drive system.
Figure 3:
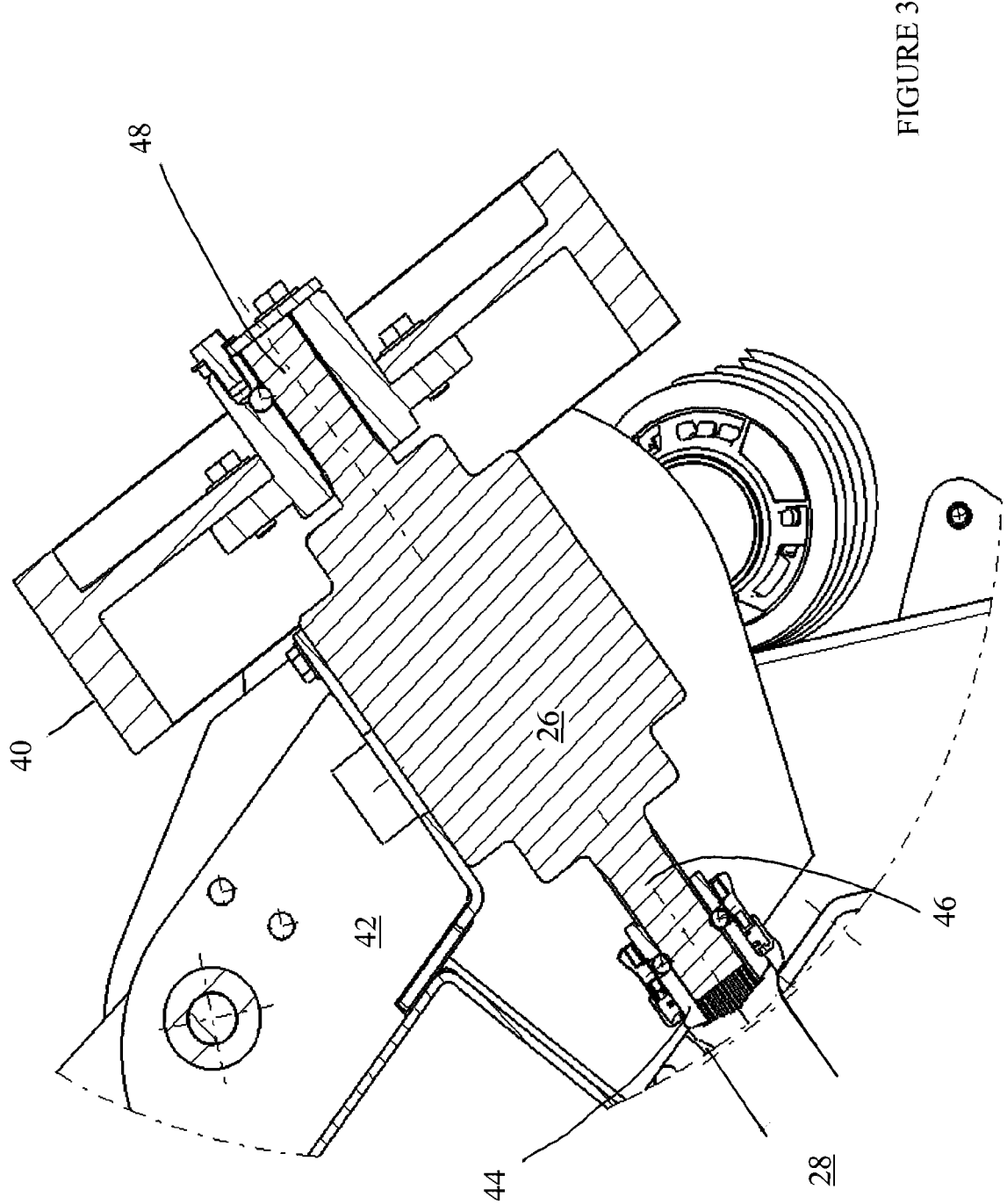
FIG. 3 is a cutaway side view of the flywheel and drive system.

The following description of the preferred embodiment(s) is merely exemplary in nature and is in no way intended to limit the invention, its application, or uses.

Referring now to the drawings wherein like numbers indicate like elements, draper header 10 includes an upper rear frame member 12 and a lower rear frame member 14 and a rear wall 16. A draper 18 is mounted on the bottom 20 of the header and disposed thereon to be driven for the movement of crop towards the center of the header, there to be guided into a feeder house. A cutter bar 22 is mounted on the front of the bottom of the header. The cutter bar is driven by a mechanical drive. The mechanical drive includes a rear shaft 24, a T gear box 26, a side drive shaft 28 and the final gear box 30 for the cutter bar. In the depicted embodiment, the final gear box 30 is an epicyclic planetary gear box. The gear box 30 is operatively engaged with cutter bar 22 so as to drive its oscillating strokes to cut crop.

At the rear of the header is a mounting bracket 42 on which the T gear box is fixed. From the T gear box in a forward direction proceeds the side drive shaft 28. A universal joint 44 joins side drive shaft 28 to side drive shaft hub 46. (Another universal joint joins side drive shaft 28 to gear box 30.) In an opposite direction and substantially in line with the side drive shaft hub 46 is the flywheel drive shaft hub 48. Thus the positioning of the flywheel allows it to be substantially in line with the gear box 30 in order to suppress vibration and reciprocation of the gear box gear teeth.

The flywheel 40 is externally mounted. The flywheel 40 suppresses vibration through the effect of its inertia. Inertia is the product of mass and angular velocity. A greater diameter will therefore increase the useful inertia of a flywheel without a disadvantageous increase in mass. By mounting the flywheel 40 in an external position, remote from the gear box 30, a greater diameter 49 may be used, thus advantageously reducing the overall mass of the header on which it is mounted while increasing vibration suppressing inertia. Moreover, mounting the flywheel in a remote location reduces the package size of the gear box unit 30, saving space at the front of the header, which allows narrower crop dividers to be advantageously used.

The drive system of the present invention may only drive a single side knife drive, or two knife drives. The two knife drives may be timed to offset one anothers' vibrations by oscillating reciprocally. In a two knife header, a second side T-gear box may be timed to turn the opposite direction to the first, opposing side. This can be done by turning the T-gear box upside down.

Figure 4:
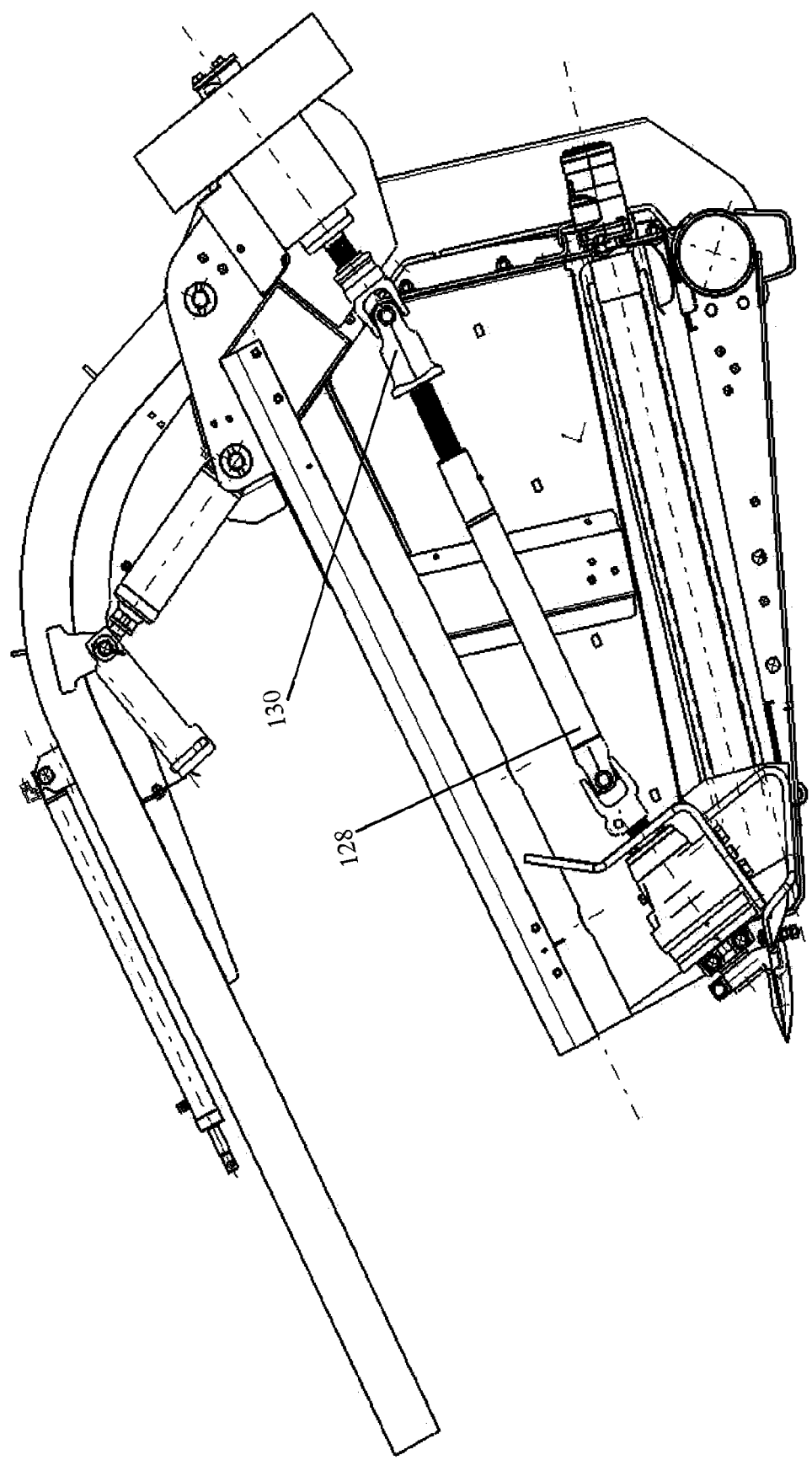
FIG. 4 is a side view of an alternative embodiment.

FIG. 4 is a side view of an alternate embodiment of the invention. In the depicted embodiment, the side drive shaft 128 is mounted with a torsion dampener 130 at its rear end, adjacent the universal joint.

In either depicted embodiment, the flywheel has an outside diameter of about 350 mm and an inside diameter of about 300 mm, with a mass of about 33 kg. This flywheel has an inertia value of about 0.6 kg*m^2. Hence, surprisingly, with a mass of only 33 kg added to the header, an advantageous range of torques in the drive shaft of about +/−400 N*m is achieved in the first embodiment. In the embodiment of FIG. 4, including the torsion dampener, shaft torques are advantageously reduced to as low as about 100 N*m.

In either depicted embodiment, the novel placement of the flywheel advantageously segregates the positive-negative cyclical torque from the cutter bar/gear box from continuing back through the drive train to the combine itself, thus reducing knife vibrations.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is

1. A draper header for a harvester or combine having a cutter bar drive system comprising:
   a header frame having a front, a rear and a side, said rear of said header frame having a top and a bottom;
   a cutter bar mounted on said front;
   a rear drive shaft mounted on said rear of said header frame;
   a T gear box mounted on said top of said rear of said header frame and said T gear box being operatively engaged with said rear drive shaft;
   a side drive shaft, said side drive shaft being mounted on said side of said header frame and said side drive shaft being operatively engaged with a first drive hub of said T gear box;
   a cutter bar gear box mounted on a front portion of said side of said header frame, said cutter bar gear box being driven by said side drive shaft and said cutter bar gear box driving said cutter bar; and
   a fly wheel mounted on an opposing drive hub of said T gear box such that said fly wheel is separated from said cutter bar gear box by a length of said side drive shaft and by said T gear box and such that said fly wheel is initially engaged with said cutter bar gear box.

2. The draper header of claim 1 further comprising:
   said header frame having a second side bilaterally opposing said side, said second, opposing side having generally mounted on it;
   a second cutter bar mounted on said front of said header frame;
   a second rear drive shaft mounted on said rear of said header frame;
   a second T gear box mounted on said top of said rear and operatively engaged with said second rear drive shaft;
   a second side drive shaft operatively engaged with a first drive hub of said second T gear box, said second side drive shaft being mounted on said second side;
   a second cutter bar gear box mounted on a front portion of said second side, said second cutter bar gear box being driven by said second side drive shaft and said second cutter bar gear box driving said second cutter bar; and
   a second fly wheel mounted on an opposing drive hub of said second T gear box such that said second fly wheel is separated from said second cutter bar gear box by a length of said second drive shaft and said second T gear box and such that said second fly wheel is initially engaged with said cutter bar gear box.

3. The draper header of claim 1 wherein a diameter of said fly wheel exceeds a diameter of said cutter bar gear box.

4. The draper header of claim 1 wherein said second T-gear box is mounted to turn an opposite direction than said first T-gear box.

5. The draper header of claim 1 wherein said flywheel has a mass less than about 33 kg.

6. The draper header of claim 1 wherein cyclical torque from said cutter bar or said gear box is substantially eliminated from said rear drive shaft.

7. The draper header of claim 1 further comprising a torsion dampener in said drive system.

8. The draper header of claim 7 wherein said torsion dampener is mounted at a rearward portion of said side drive shaft.

9. A draper header for a harvester or combine having a cutter bar drive system comprising:
   a header frame having a front, a rear and a side, said rear of said header frame having a top and a bottom;
   a cutter bar mounted on said front;
   a rear drive shaft mounted on said rear of said header frame;
   a side drive shaft, said side drive shaft being operatively engaged with said rear drive shaft and said side drive shaft being mounted on said side of said header frame;
   a cutter bar gear box mounted on a front portion of said side of said header frame, said cutter bar gear box having an axis of rotation, said cutter bar gear box being driven by said side drive shaft and said cutter bar gear box driving said cutter bar; and
   a fly wheel mounted on one of said rear drive shaft or said side drive shaft and said fly wheel being initially engaged with said cutter bar gear box and said fly wheel having an axis of rotation, said flywheel axis of rotation being non-parallel to said cutter bar gear box axis of rotation;
   wherein said flywheel axis of rotation is not parallel to said rear driveshaft.

* * * * *